United States Patent
Dietz et al.

(10) Patent No.: US 7,295,888 B2
(45) Date of Patent: Nov. 13, 2007

(54) SYSTEM FOR EVALUATING A PARTS CARRIER

(75) Inventors: Mark Dietz, Saratoga Springs, UT (US); John Spangler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 124 days.

(21) Appl. No.: 11/239,142

(22) Filed: Sep. 30, 2005

(65) Prior Publication Data

US 2007/0078621 A1    Apr. 5, 2007

(51) Int. Cl.
*G06F 19/00* (2006.01)
*G06F 7/00* (2006.01)
*G06F 17/60* (2006.01)

(52) U.S. Cl. .............. 700/217; 209/597; 700/247
(58) Field of Classification Search ............ 700/217, 700/247; 209/597
See application file for complete search history.

(56) References Cited

U.S. PATENT DOCUMENTS

| | | | |
|---|---|---|---|
| 4,193,777 A | 3/1980 | de la Riviere | |
| 4,243,146 A | 1/1981 | Davitz | |
| 4,292,056 A | 9/1981 | Bloomer | |
| 4,380,495 A | 4/1983 | Maher | |
| 4,620,632 A | 11/1986 | Alemanni | |
| 4,777,783 A * | 10/1988 | Zald | 53/447 |
| 4,787,804 A * | 11/1988 | Edenas | 414/281 |
| 4,992,940 A | 2/1991 | Dworkin | |
| 5,092,928 A | 3/1992 | Spangler | |
| 5,103,963 A | 4/1992 | Stitcht | |
| 5,105,600 A * | 4/1992 | DePoint et al. | 53/468 |
| 5,147,050 A | 9/1992 | Cullen | |
| 5,249,131 A | 9/1993 | Kato | |
| 5,390,283 A | 2/1995 | Eshelman et al. | |
| 5,531,334 A | 7/1996 | Forby | |
| 5,684,053 A | 11/1997 | Spangler | |
| 5,726,233 A | 3/1998 | Mitchell et al. | |
| 5,762,205 A | 6/1998 | Davitz | |
| 5,765,138 A | 6/1998 | Aycock et al. | |
| 5,844,807 A | 12/1998 | Anderson et al. | |
| 5,897,620 A | 4/1999 | Walker et al. | |
| 5,933,349 A | 8/1999 | Dalgleish et al. | |
| 5,933,353 A | 8/1999 | Abriam et al. | |
| 6,029,966 A | 2/2000 | Hertz et al. | |

(Continued)

OTHER PUBLICATIONS

"Cube-IQ Release 3.0 User Guide" -2004 MicroLogic Optimization Inc.*

*Primary Examiner*—Michael D. Masinick
(74) *Attorney, Agent, or Firm*—Finnegan, Henderson, Farabow, Garrett & Dunner

(57) ABSTRACT

A method is disclosed for evaluating a parts carrier that is operatively associated with a material handling process. The method includes determining a plurality of parts to be processed, determining one or more types of the plurality of parts to be processed, and determining a quantity of the parts to be processed. The method also includes virtually comparing one or more parts of the plurality of parts with at least one of a length, width, or height of one or more envelopes. The method further includes selecting one of the one or more envelopes as a function of one of the percentage of the types of parts capable of being accommodated with the one or more envelopes or the percentage of the quantity of parts capable of being accommodated within the one or more envelopes.

21 Claims, 4 Drawing Sheets

U.S. PATENT DOCUMENTS

| | | |
|---|---|---|
| RE36,602 E | 3/2000 | Sebastian et al. |
| 6,260,024 B1 | 7/2001 | Shkedy |
| 6,374,200 B1 * | 4/2002 | Nakagawa ..................... 703/8 |
| 6,654,662 B1 * | 11/2003 | Hognaland .................. 700/214 |
| 6,664,969 B1 * | 12/2003 | Emerson et al. ............ 345/544 |
| 6,737,600 B2 * | 5/2004 | Takizawa .................... 209/583 |
| 6,760,642 B2 | 7/2004 | Tsuruta et al. |
| 6,829,514 B2 | 12/2004 | Gyorfi et al. |
| 6,868,298 B2 | 3/2005 | Baweja et al. |
| 6,871,116 B2 * | 3/2005 | Brust et al. .................. 700/245 |
| 2002/0099585 A1 * | 7/2002 | Locke ........................... 705/7 |
| 2003/0163381 A1 | 8/2003 | Spangler |
| 2004/0074823 A1 | 4/2004 | Brust et al. |

* cited by examiner

SYSTEM FOR EVALUATING A PARTS CARRIER

TECHNICAL FIELD

The present disclosure relates to a parts carrier and, more particularly, to a method and apparatus for evaluating a parts carrier.

BACKGROUND

Material handling processes are typically used to manipulate a plurality of parts in one or more stages thereof to transform the parts from a less desired state toward a more desired state. Multiple processes may be interrelated to perform successive manipulations to produce a desired final product. Typically, each of the multiple processes has a different throughput capacity and/or has a different processing cycle time per part or per a grouping of parts. Throughput and cycle time are typically a function of the available processing space for given stage, e.g., the space available to manipulate parts at a particular stage. Recent material handling trends, conventionally labeled as "lean manufacturing" and/or "just in time manufacturing," attempt to deliver an appropriate number of parts between successive stages and successive processes at the point in time when the parts can be manipulated by the successive stage or process. As such, these trends attempt to reduce over production of parts and stockpiling associated with low cycle time manipulations and/or attempt to reduce shortages associated with high cycle time manipulations. Additionally, it is desirable to reduce the processing time and resources required to manipulate parts in an attempt to lower the handling cost per part while increasing productivity.

These material handling processes often include the movement of the parts between stages and/or processes. The parts are typically supported on parts carriers for such movement. Although, the parts may be arranged on a parts carrier in numerous different configurations, many factors may affect the arrangement of the parts, such as part weights, limits of the material handling processing space, access to the parts for manipulation, safety in transporting, and/or other handling factors known in the art. The arrangement of parts on the parts carriers may have significant effects on the throughput capacity and cycle time of a stage and/or process.

Typically, operators individually select the arrangement of parts on the parts carriers and either manually or robotically place the parts on the parts carriers based on non-uniform weighing of factors and/or inconsistent judgment criteria which may lead to inefficient loading of the parts carriers. For example, a material handling process may be inefficiently operated because the parts carriers may be loaded with too low a density of parts or because the parts carriers may be loaded with too high a density. As a result, a material handling process may be capable of outputting more parts than that being produced, the material handling process may inadequately manipulate the parts, and/or the material handling process may overproduce certain parts and underproduce other parts.

U.S. patent application Publication 2004/0074823 ("the '823 application") filed by Brust et al. discloses a system for determining pallet case configurations. The '823 application discloses a control system configured to specify arrangements of cases for placement on pallets and direct a material handling system to physically place the cases on the pallets. The '823 application further discloses that the cases may be categorized within an inventory management system based on physical attributes of the cases. The control system receives an input specifying the number and type of cases to be arranged and determines a plurality of layer configurations based on the physical attributes. The control system further determines a height and volume that a pallet would occupy if loaded and compares these dimensions with predetermined thresholds.

Although the '823 application may arrange cases on a pallet as a function of individual case dimensions and pallet thresholds, it may not optimally load cases with respect to a desired throughput. For example, constructing stable pallets with desired arrangements of cases does not necessarily evaluate the importance of the threshold values and the corresponding impact thereof on other stages or processes. Additionally, the '823 application may not evaluate the impact a particular threshold value has on the throughput and/or cycle time to determine, arrange, and construct a pallet.

The present disclosure is directed to overcoming one or more of the problems set forth above.

SUMMARY OF THE INVENTION

In one aspect, the present disclosure is directed to a method for evaluating a parts carrier that is operatively associated with a material handling process. The method includes determining a plurality of parts to be processed, determining one or more types of the plurality of parts to be processed, and determining a quantity of the plurality of parts to be processed. The method also includes virtually comparing one or more parts of the plurality of parts with at least one or more of a length, width, or height of one or more envelopes. The method further includes selecting one of the one or more envelopes as a function of one of the percentage of the types of parts capable of being accommodated with the one or more envelopes or the percentage of the quantity of parts capable of being accommodated within the one or more envelopes In another aspect, the present disclosure is directed to system for arranging a plurality of parts on a plurality of carriers. The system includes a computer, a user interface, and a computer executable program. The computer executable program is capable of comparing data indicative of physical characteristics of a plurality of parts and data indicative of physical characteristics of at least one process space to determine a quantity of parts that can be accommodated by the at least one process space. The computer executable program is also capable of determining a quantity of carriers configured to support the quantity of parts such that each carrier is configured to support one or more of the plurality of parts.

DETAILED DESCRIPTION

Figure 1C:
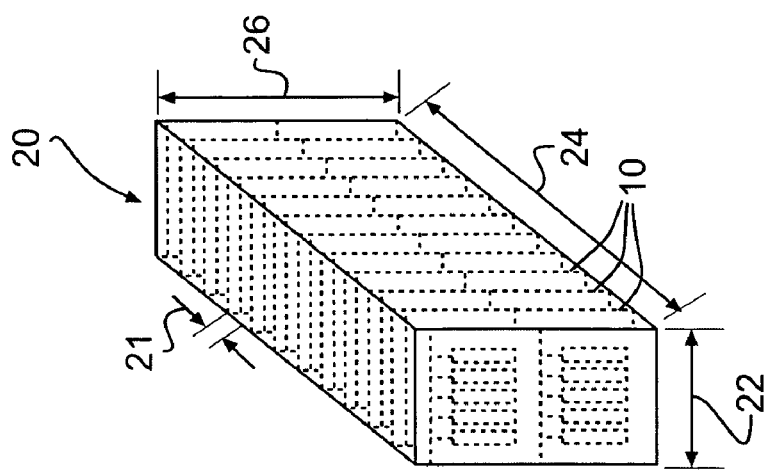
FIG. 1C is a diagrammatic illustration of a parts envelope in accordance with the present disclosure.
Figure 1B:
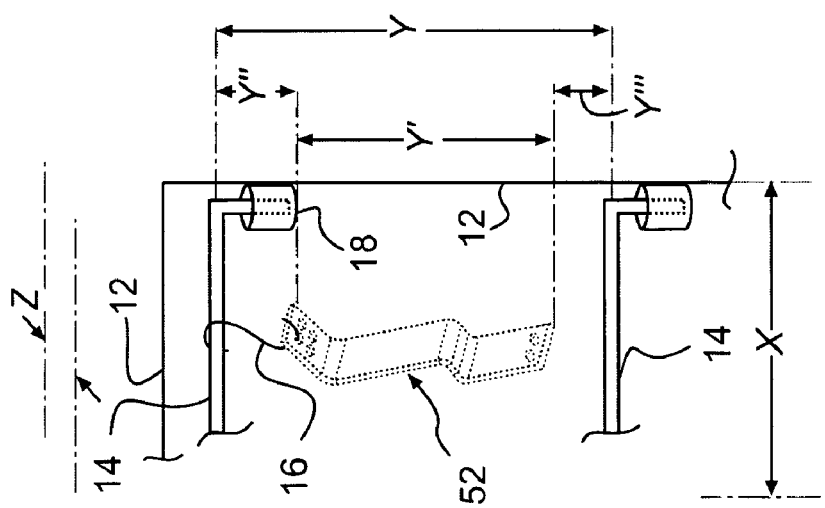
FIG. 1B is a diagrammatic illustration of a detail of the parts carrier of FIG. 1A.
Figure 1A:
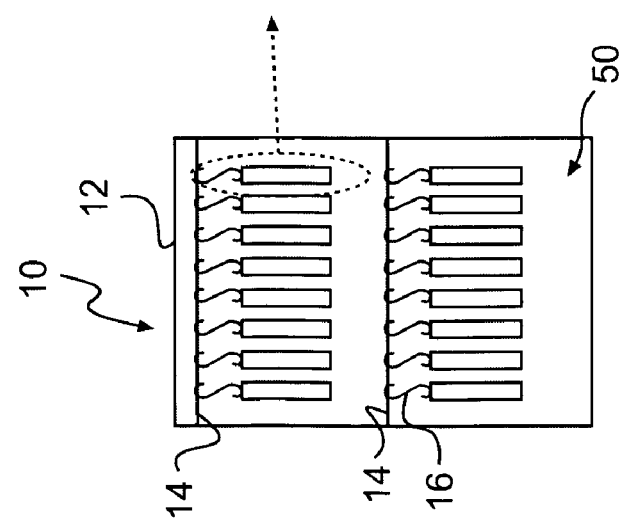
FIG. 1A is an exemplary diagrammatic illustration of a parts carrier in accordance with the present disclosure.

FIG. 1A illustrates an exemplary parts carrier 10 for use with a material handling process such as, for example, a painting process, a fabrication process, an assembly process, a packaging process, and/or any other material handling process known in the art. Parts carrier 10 may include a rack, a hanger, a pallet, a trolley, a cart, an intermediate component, and/or any part support known in the art. For clarification purposes only, parts carrier 10 is illustrated as a rack, however, it is noted that the present disclosure is applicable to any type of parts carrier.

Parts carrier 10 may include a frame 12 and one or more load bars 14 operatively connected to frame 12. Parts carrier 10 may be configured to support one or more parts 50 to facilitate movement, presentation, and/or any other application of parts 50 with respect to a material handling process. Specifically, as illustrated in FIG. 1B, parts 50 may be operably connected to load bars 14 by any known suitable mechanism, such as, for example, hooks 16. Load bars 14 may be operably connected to frame 12 by any known suitable mechanism, such as, for example, slots 18. Frame 12 may be configured to support any number of load bars 14 with any desired spacing therebetween. It is contemplated that parts carrier 10 may be any size or shape, may be made from any material, and/or may be configured to support any type or quantity of parts 50.

Parts 50 may include any number of parts desired to be manipulated by a material handling process. Parts 50 may be exemplified by a first part 52 which may have physical characteristics including a length value X, a depth value Z, a height value Y, and a weight value (not referenced). Specifically, length, depth, and height values X, Z, Y may include the respective widths, depths, and heights of first part 52 plus one or more respective factors thereof. For example, height value Y may include a height Y' of part 52, a first height factor Y" and a second height factor Y'" representative of desired spacing between part 52 and adjacent load bars 14. Length and depth values X, Z may, similar to height value Y, include a respective length and width (not shown) of part 52 and first and second factors (not shown) representative of desired spacing between part 52 and adjacent parts 50. It is contemplated that the desired spacing may improve the manipulation of parts 50 by the material handling process. For example, a desired spacing may be necessary between adjacent parts 50 to ensure adequate coating of paint during a painting process, to allow a painting tool to have access to each of parts 50, to expose each of parts 50 to an environment, and/or any other material handling process manipulation. It is also contemplated that the factors may be determined and/or established by any methodology known in the art, such as, for example, trial and error, mathematical equations, and/or experience. It is also contemplated that parts 50 may be exemplified by any characteristics such as, for example, temperature limitations, colors, and/or any other characteristic known in the art. It is noted that first part 52 is diagrammatically shown as a bracket for clarification purposes only, and that parts 50 may be any part and/or object having any physical dimensions and/or requiring any type of manipulation.

FIG. 1C illustrates an exemplary envelope 20 which may represent one or more parts carriers 10 separated by gaps 21 and may include a length 22, a depth 24, and a height 26. Length 22, depth 24, and height 26 may be configured to represent the boundary of a process space within a material handling process. Specifically, a particular material handling process may include one or more stages wherein parts 50, supported by one or more parts carriers 10, are substantially simultaneously manipulated within that stage. For example, a painting process may include a stage wherein a plurality of parts 50 are cured in an oven which may have a substantially fixed internal volume. As such, envelope 20 may, for example, represent the length, depth, and height of the internal volume of the oven. It is contemplated that envelope 20 may be configured to represent a fixed process space, for example, for evaluation of an existing process. It is also contemplated that a plurality of envelopes may be configured to represent different process spaces, for example, during design of a new process, and/or for evaluation of a process having different allowable spaces for different stages therein.

Figure 2:
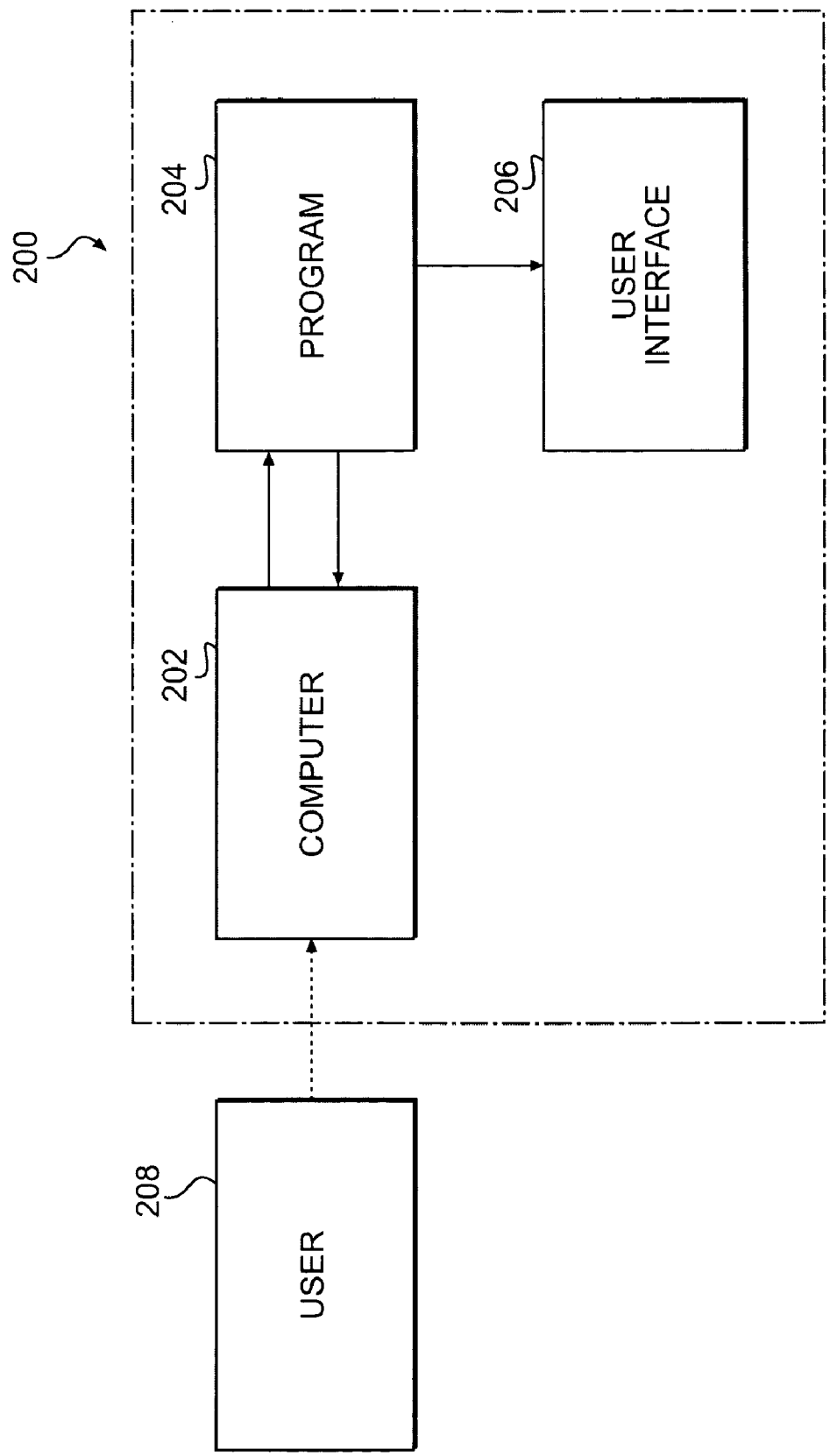
FIG. 2 is an exemplary system for evaluating the parts carrier of FIG. 1A and the parts envelope of FIG. 1C.

FIG. 2 schematically illustrates an exemplary system 200 for evaluating parts carrier 10. System 200 may include a computer 202, a program 204, and an interface 206. System 200 may be configured to accept inputs from a user 208 via computer 202 to evaluate one or more parts carriers 10 and/or one or more envelopes 20. System 200 may be further configured to display data and/or graphics in interface 206 representative of parts carriers 10 and/or of envelopes 20. It is contemplated that system 200 may include additional components such as, for example, a communications interface (not shown), a memory (not shown), databases (not shown), and/or other components known in the art.

Computer 202 may include a general purpose computer configured to operate executable computer code. Computer 202 may include one or more input devices, such as, for example, a keyboard (not shown) or a mouse (not shown) to introduce user inputs into computer 202. Computer 202 may also include one or more data manipulation devices, such as, for example, databases (not shown) or software programs (not shown) to transfer and/or alter user inputs. Computer 202 may also include one or more communication devices, such as, for example, a modem (not shown) or a network link (not shown) to communicate inputs and/or outputs with program 204. It is contemplated that computer 202 may further include additional and/or different components, such as, for example, a memory (not shown), a communications hub (not shown), a data storage (not shown), a printer (not shown), an audio-video device (not shown), removable data storage devices (not shown), or other components known in the art. It is also contemplated that computer 202 may communicate with program 204 via, for example, a local area network ("LAN"), a hardwired connection, and/or the Internet.

Program 204 may include a computer executable code routine configured to perform one or more sub-routines and/or algorithms to virtually represent and evaluate parts carriers 10 and/or envelopes 20 within system 200. Specifically, program 204 may be configured to perform an exemplary method 300, a detailed description of which is set forth below with reference to FIG. 3. Program 204 may further be configured to communicate with interface 206 to represent and/or manipulate data representative of the parts carriers 10 and/or envelopes 20. It is contemplated that program 204 may be stored within the memory (not shown) of computer 202 and/or stored on a remote server (not shown) accessible by computer 202. It is further contemplated that program 204 may include additional sub-routines and/or algorithms to perform various other operations with respect to mathematically representing data, generating or importing additional data into program 204, and/or performing other computer executable operations.

Interface 206 may be configured to interact with program 204 to visually display and/or represent relationships of data to user 208. Specifically, interface 206 may be configured to display the relationships of the plurality of data to show a mathematical or graphical representation of parts carriers 10 and/or envelopes 20 and/or display characteristics thereof. It is contemplated that interface 206 may display a plurality of numbers, text, graphics, and/or any other indicia.

Figure 3:
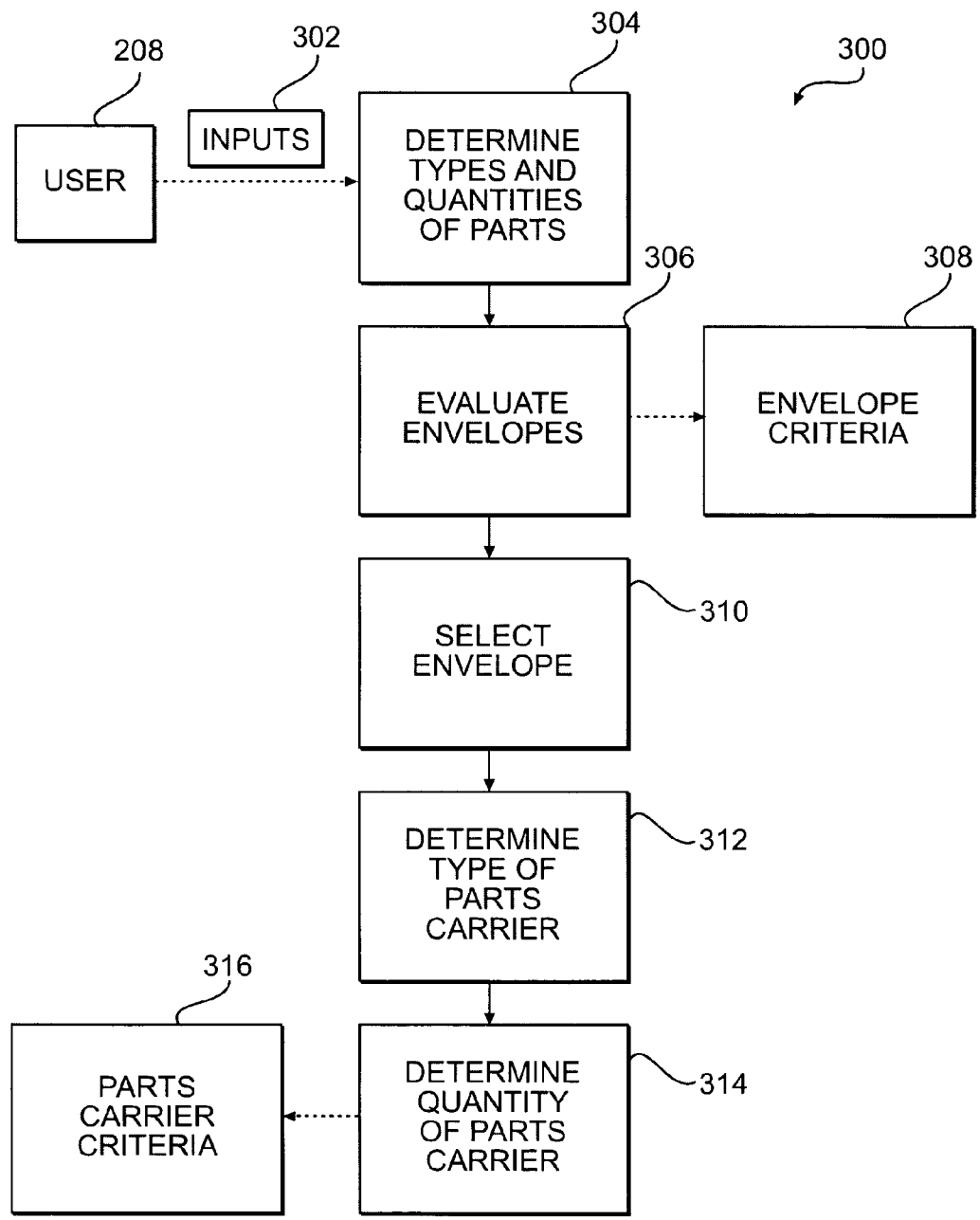
FIG. 3 is a flow chart of a method to evaluate the parts carrier of FIG. 1A and the parts envelope of FIG. 1C within the system of FIG. 2.

FIG. 3 illustrates an exemplary method 300 which may be configured to evaluate parts carrier 10 and/or envelope 20. Method 300 may include receiving one or more inputs 302 from user 208, determining one or more part types and part quantities, step 304, evaluating one or more envelopes 20, step 306, and outputting one or more envelope criteria, step 308, configured to relate the part types, quantities, and/or envelopes 20. Method 300 may also include selecting an envelope 20, step 310, determining a type of parts carrier 10, step 312, and determining a quantity of parts carriers 10, step 314 desired for the determined part types and/or quantities. Method 300 may further include outputting one or more parts carrier criteria, step 316, configured to relate the parts types, the parts quantities, and/or the determined parts carriers quantity. It is contemplated that method 300 may be performed and/or operated as a continuous method, as a non-continuous method, as a batch method, and/or as any other method known in the art.

User 208 may deliver inputs 302 to program 204 via computer 202. The inputs may include a plurality of data configured to represent the one or more part types, the quantity of parts, and/or one or more types of envelopes 20 associated with a particular material handling process and/or finished component. Program 204 may accept inputs 302 from user 208 and perform one or more sub-routines and/or algorithms therewith. It is contemplated that inputs 302 may be delivered, for example, by computer 202 to program 204 by an input/output interface or other computer communication interface known in the art. It is contemplated that the inputs 302 may be indicative of a predetermined grouping of one or more parts 50, indicative of the actual type of envelope 20 and/or a desired type of envelope 20.

Step 304 may include determining the type of parts 50 and the quantity of parts 50 associated with a particular operation of a material handling process. For example, a particular operation may require a particular quantity of each of a plurality of different types of parts 50. Program 204 may be configured to access one or more relational databases (not shown) to determine the types and quantities of parts 50 based on inputs 302. It is contemplated that inputs 302 may be representative of a class, category, and/or other indicator associated with a predetermined set of parts 50 and that program 204 may access a database populated with the types and quantities of parts 50 associated with such a class or category. It is contemplated that in the alternative, user 208 may directly input the different types and quantity of parts 50.

Step 306 may include evaluating envelopes 20. Specifically, program 204 may be configured to evaluate each of the one or more envelopes 20 input by user 208 with respect to the determined types and quantities of parts 50. Program 204 may be configured to compare characteristics of parts 50 with characteristics of each of envelopes 20. For example, program 204 may be configured to compare length, width, and height values X, Z, Y of each of parts 50 with width 22, length 24, and height 26 of each of envelopes 20 so as to virtually determine if a particular one of parts 50 will fit within a particular envelope 20. For example, step 306 may compare length value X of first part 52 with length 22 of envelope 20 to virtually determine if length value X if less than length 22. Similarly, step 306 may compare depth value Z and height value Y of first part 52 with depth 24 and height 26. As such, step 306 may virtually determine if first part 52 may fit within the process space of a material handling process as represented by envelope 20. It is contemplated that step 306 may compare length, depth, and height values X, Z, Y of part 50 with any one of length, depth, and/or height 22, 24, 26 so as to model the ability of parts 50 to be rotated relative to envelope 20, e.g., the labeling of width, length, and height values of parts 50 and the one or more envelopes 20 are arbitrarily chosen for clarification purposes only.

Program 204 may also be configured to evaluate the weight of each of parts 50 with respect to the one or more envelopes 20 within step 306. Specifically, program 204 may compare a weight of one of parts 50 with a predetermined acceptable weight of each of the one or more envelopes 20. As such, step 306 may also determine if the weight of one or more of parts 50 exceeds a weight limit of the process space of a material handling process. It is contemplated that the weight limit of the process space may be limited by a structural component of parts carrier 10, e.g., a limit of load bar 14, a limit of a structural component of a material handling process, e.g., a limit of a conveyor, and/or any weight limit associated with the transportation and/or support of parts 50 relative to the material handling process. It is also contemplated that program 204 may be configured to additionally or alternatively evaluate any physical characteristic known in the art such as, for example, temperature limitations and/or color, of each of parts 50 with respect to one or more envelopes 20 within step 306.

Step 308 may include program 204 outputting envelope criteria. The envelope criteria may include one or more data indicative of the evaluation of each of parts 50 relative to each of envelopes 20. Specifically, step 308 may output, for each of envelopes 20 evaluated within step 306, the number and/or percentage of types of parts 50 that may be accommodated by a respective envelope 20. Similarly, step 308 may also output the number and/or percentage of the quantity of parts 50 that may be accommodated by a respective envelope 20. As such, the envelope criteria may be interpreted by user 208 to compare envelopes 20 with respect to the types and quantity of parts 50 that are desired to be processed by the material handling process. It is contemplated that step 308 may additionally or in the alternative output envelope indicia indicative of the percentage and/or quantity of parts 50 that may not be accommodated by a respective envelope 20.

For example, the envelope criteria may indicate that a particular envelope 20 may accommodate 99% of the types of parts 50 and may accommodate 95% of the quantity of parts 50, which may indicate to user 208 that such a particular envelope may be adequate for the manipulation of parts 50. It is contemplated that the envelope criteria may be compared to acceptable ranges of criteria to determine the adequacy of a particular envelope 20 with respect to particular parts 50. It is also contemplated that user 208 may manually assess the envelope criteria and/or that program 204 may be configured to perform one or more algorithms to assess the envelope criteria with respect to acceptable ranges. It is further contemplated that the percentage of types and quantities of parts 50 that a particular envelope 20 may not accommodate may be manipulated by a different process such as, for example, an out-sourced supplier.

Step 310 may include selecting an envelope 20. Specifically, step 310 may include selecting a desired envelope 20 that may be utilized to accommodate a desired percentage of types and quantities of parts 50. For example, program 204 may be configured to select and/or receive an input from user 208 to select an envelope 20. It is contemplated that the selected envelope may be chosen for any one of a plurality of reasons such as, for example, because an envelope 20 may be large enough to accommodate 100% of parts 50, or accommodate 95% of the types of parts 50 and 99% of the quantity of parts 50, and/or any other desired reason. It is also contemplated that it may be desirable to select an envelope 20 that may not accommodate 100% of parts 50 because the envelope may be inefficiently too large, e.g., the material handling process that includes a process space (represented by an envelope 20) that can accommodate 100% of parts 50 may be unnecessarily expensive to build and/or maintain when a relatively smaller envelope 20 may accommodate almost all of the types and/or quantities of parts 50 necessary to be processed.

Step 312 may include determining a type of parts carrier 10. Specifically, step 312 may include determining a type of parts carrier 10 that corresponds to the selected one of envelopes 20. For example, program 204 may be configured to select a parts carrier 10 that approximates the width and height of the selected envelope 20.

Step 314 may include determining the number of parts carriers 10 necessary for parts 50. Specifically, program 204 may determine the number of the selected parts carriers 10 needed to support accommodated parts 50 for a given material handling process. Program 204 may be configured to virtually load each of accommodated parts 50 onto successive parts carriers 10 until each of parts 50 are virtually loaded.

Figure 4:
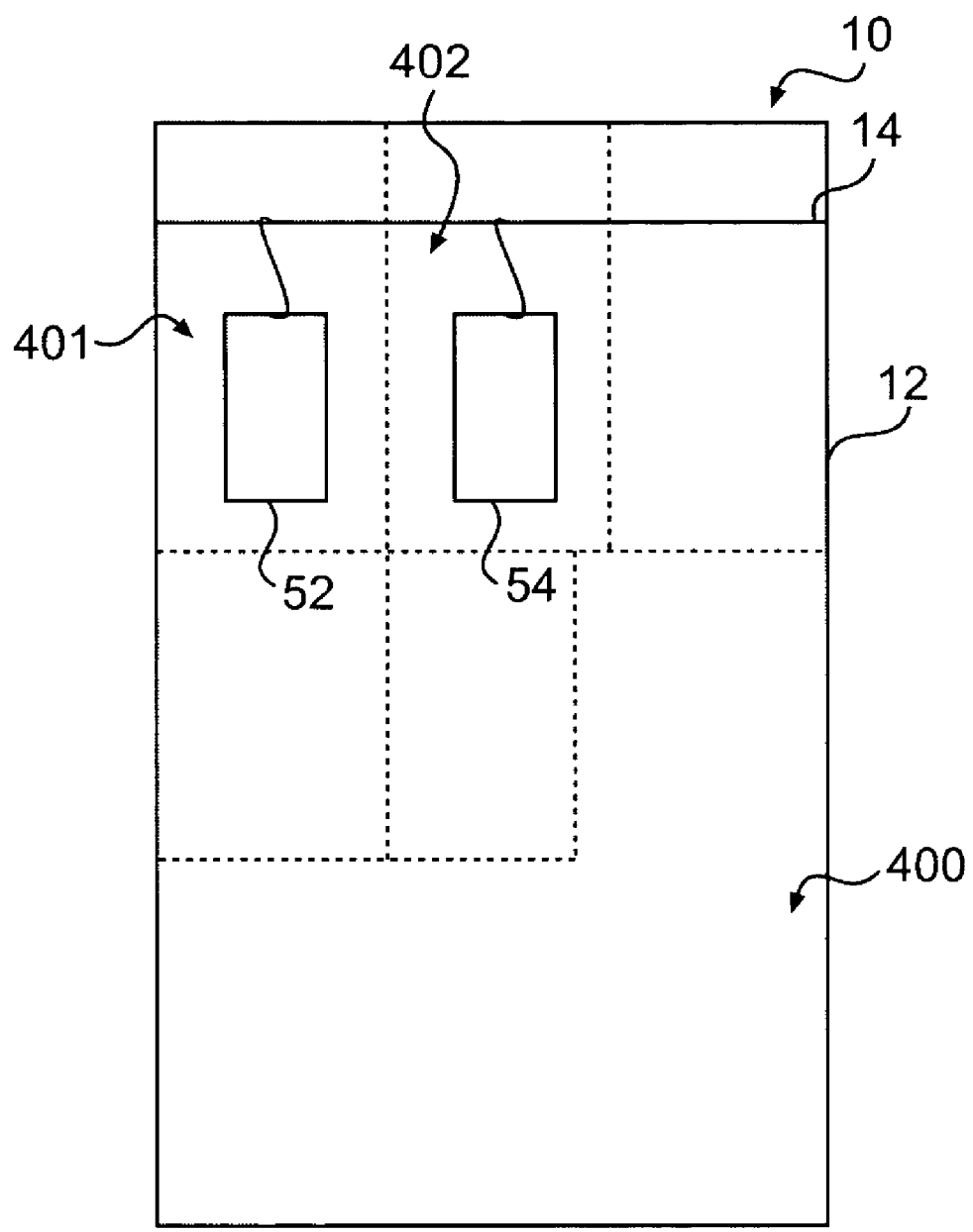
FIG. 4 is a schematic illustration of a virtual parts carrier used in evaluating the parts carrier of FIG. 1A with the method of FIG. 3.

For example and with reference to FIG. 4, program 204 may virtually position first part 52 on load bar 12 at first virtual position 401 located within a virtual space 400 of parts carrier 10. Program 204 may virtually position first part 52 by comparing length, depth, and height values X, Z, Y thereof to characteristics of parts carrier 10. Subsequently, program 204 may virtually position second part 54 at second virtual position 402 by comparing the length, depth, and height values X, Z, Y thereof to characteristics of parts carrier 10 and first part 52. Program 204 may similarly virtually position the remainder of parts 50 and may progress to additional parts carriers 10 when a selected part in sequence cannot be virtually positioned within the remainder of virtual space 400 of a particular parts carrier 10. It is contemplated that program 204 may be configured to position additional load bars 14 on parts carriers 10 as necessary for virtually positioning parts 50 within virtual space 400. It is also contemplated that program 204 may be configured to locate load bars 14 at predetermined positions relative to frame 12 as a function of the design of the selected parts carrier 10 and the available positions thereon for operatively coupling load bars 14 to frame 12. It is further contemplated that program 204 may virtually position parts 50 within virtual space 400 by any suitable algorithm such as, for example, by representing parts carrier 10 and first and second parts 52, 54 as volumes and substantially aligning boundaries of such volumes to be coincident.

Referring again to FIG. 3, step 316 may include outputting parts carrier criteria. Specifically, step 316 may include outputting the determined quantity of parts carriers 10 necessary to support all of accommodated parts 50 and outputting the types and quantities of parts 50 supported on each of parts carriers 10. Program 204 may be configured to display the parts carrier criteria within interface 206 and/or output the parts carrier criteria to a remote display (not shown) to a printer (not shown), and/or to any other device to display the parts carrier criteria.

Industrial Applicability

The disclosed system may be applicable to any material handling process in which parts are arranged on parts carriers. The disclosed system may be configured to evaluate one or more existing or conceptual processes to determine a suitable process which adequately manipulates parts and may enable the evaluation of an existing material handling process and its available throughput to reduce stockpiling or shortages. The operation of method 300 is explained below with reference to a painting process for clarification purposes only, and it is noted that the explanation is applicable to any material handling process.

For example, it may be desired to produce a given quantity of finished components from an assembly line per day. Each of the finished products may include a plurality of parts each of which may require paint processing, such as, priming, curing, coating, and/or any other painting process manipulation. Accordingly, to achieve the desired quantity of finished components, a painting process may be required to process a given quantity of parts which will be assembled into a finished component. It is contemplated that for a given finished component, such as, for example, a back-hoe, the parts necessary for assembly and, in particular, necessary to be manipulated by a painting process may be predetermined and/or known. It is also contemplated that user 208 may alternatively input each type and quantity of parts necessary to be manipulated by the painting process.

Referring to FIGS. 2 and 3, user 208 may input (302) the desired production quantity of finished components into program 204 via computer 202. Program 204 may be configured to determine (step 304) the types and quantities of parts 50 necessary to be processed, including respective length, depth, and height values X, Z, Y and weight for each part type. User 208 may also input (302) one or more envelopes 20 corresponding to available process spaces within one or more painting processes.

Program 204 may evaluate (step 306) the one or more envelopes 20 with respect to parts 50. Specifically, program 204 may compare length, depth, and height values X, Z, Y and weight of each of parts 50 with length, depth, and height 22, 24, 26 of each of envelopes 20, as well as the weight carrying capacity of envelopes 20. Program 204 may output envelope criteria (step 308) for each of envelopes 20. Envelope criteria may include raw data and/or statistical data representative of the percentage of part types and quantities that each of envelopes 20 may accommodate. It is contemplated that program 204 may only compare one of each of the different types of parts 50 with each of envelopes 20 to reduce computation time and system resources.

User 208 may select one of envelopes 20 (step 310) in response to the envelope criteria. It is contemplated that program 204 may be configured to select one of envelopes 20 based on the envelope criteria in response to a predetermined algorithm configured, for example, to select the one of envelopes 20 within a predetermined range of acceptable envelope criteria. Program 204 may also determine the type of parts carrier (step 312) that corresponds to the selected envelope 20.

Program 204 may further evaluate the selected parts carrier (step 314) with respect to parts 50. Specifically, program 204 may virtually load each of parts 50 on parts carriers progressing to an additional parts carrier 10 when the remainder of the available virtual area 400 of a particular parts carrier 10 cannot accommodate a subsequent one of parts 50 in series. Program 204 may output parts carrier criteria (step 316), which may include the quantity of parts carriers 10 necessary to accommodate the quantity of parts 50 and/or the arrangement of parts 50 on each one of the quantity of parts carriers 10.

As such, program 204 and, in particular method 300, may evaluate one or more envelopes 20 representative of different available processing spaces, such as, for example, adjustable process spaces within a single existing material handling process, fixed process spaces within multiple existing material handling processes, and/or adjustable process spaces within one or more conceptual material handling processes. Accordingly, the present disclosure may be applicable to compare one or more in-house processes, one or more out-sourced processes, and/or one or more conceptual processes to determine and select an appropriate one thereof for manipulation of parts 50. Additionally, because the program 204 and, in particular method 300, may determine the quantity of parts carriers and/or the arrangement of parts thereon, the present disclosure may be applicable to evaluate the current throughput and cycle time of a process having manually arranged parts and parts carriers and/or to establish consistent judgments in the arrangement and loading of parts on parts carriers. Furthermore, the present disclosure may be applicable to reduce stockpiling and/or under production of parts, thereby improving efforts to achieve lean manufacturing and to reduce process time and resources while increasing productivity of finished products by optimally arranging parts 50 onto parts carriers as a function of the available processing space.

It will be apparent to those skilled in the art that various modifications and variations can be made to the disclosed system for evaluating a parts carrier. Other embodiments will be apparent to those skilled in the art from consideration of the specification and practice of the disclosed system. It is intended that the specification and examples be considered as exemplary only, with a true scope being indicated by the following claims and their equivalents

What is claimed is:

1. A method for evaluating a parts carrier operatively associated with a material handling process comprising:
   determining a plurality of parts to be processed;
   determining one or more types of the plurality of parts to be processed;
   determining a quantity of the plurality of parts to be processed;
   executing a computer executable program stored in a computer memory to virtually compare one or more parts of the plurality of parts with at least one of a length, width, or height of one or more envelopes; and
   selecting one of the one or more envelopes as a function of one of:
      the percentage of the types of parts capable of being accommodated within the one or more envelopes, and
      the percentage of the quantity of parts capable of being accommodated within the one or more envelopes.

2. The method of claim 1, further including executing the computer executable program to virtually compare comparing a weight of one or more of the plurality of parts with a predetermined acceptable weight, wherein the acceptable weight is a function of the weight capable of being accommodated by the one or more envelopes.

3. The method of claim 1, wherein the one or more envelopes are configured to represent one or more processing spaces within the material handling process or within additional material handling processes.

4. The method of claim 1, further including:
   determining the plurality of parts as a function of a desired production of one or more finished components, wherein the plurality of parts are elements of the one or more finished components.

5. The method of claim 1, wherein the plurality of parts includes at least two parts, the at least two parts having different geometric shapes.

6. The method of claim 1, further including:
   determining a quantity of parts carriers to necessary to support the plurality of parts for transportation through the material handling process.

7. The method of claim 6, further including outputting to a system interface data indicative of an arrangement of parts to be physically loaded on parts carriers for each of the determined quantity of parts carriers.

8. The method of claim 1, wherein the material handling process is a painting process.

9. A system for arranging a plurality of parts on a plurality of carriers comprising:
   a computer;
   a user interface; and
   a computer executable program stored in a computer memory being capable of:
      comparing data indicative of physical characteristics of a plurality of parts and data indicative of physical characteristics of at least one process space to determine a quantity of parts that can be accommodated by the at least one process space, and
      determining a quantity of carriers configured to support the quantity of parts, each carrier being configured to support one or more of the plurality of parts.

10. The system of claim 9, wherein the quantity of parts includes fewer parts than the plurality of parts.

11. The system of claim 9, wherein the physical characteristics of the plurality of parts includes one of a length, width, height or weight value.

12. The system of claim 11, wherein each of the length, width, and height values includes:
   a respective length, width, and height of a part; and
   at least one factor indicative of a desired spacing.

13. The system of claim 9, wherein the physical characteristics of the at least one process space includes one of a length, width, or height value.

14. The system of claim 9, wherein the at least one process space is configured to be indicative of a space in which a group of parts may be manipulated substantially simultaneously.

15. The system of claim 9, wherein the computer executable program is further configured to display a percentage of the plurality of parts that can be accommodated by the at least one process space in the user interface.

16. The system of claim 15, wherein each part of the of the plurality of parts that can be accommodated by the at least one process space includes physical characteristics that are functionally less than the physical characteristics of the at least one process space.

17. A method of determining a quantity of parts carriers for a material handling process comprising:

receiving at least one input from a user into a computer executable program stored in a computer memory, the at least one input being indicative of a plurality of parts to be processed;

determining one or more types of parts and a quantity of the plurality of parts to be processed;

executing the computer executable program to compare the one or more types of parts with one or more predetermined spaces;

selecting one of the one or more predetermined spaces;

determining the parts carrier as a function of the selected predetermined space, the parts carrier having an area; and outputting the quantity of parts carrier as a function of the area and the quantity of parts.

18. The method of claim 17, wherein the predetermined space is configured to be indicative of an available processing space of the material handling process.

19. The method of claim 17, further including:

executing the computer executable program to virtually compare characteristics of the area and characteristics of the one or more types of parts; and determining the quantity of parts carriers by virtually loading the quantity of parts on one or more parts carriers.

20. The method of claim 19, further including displaying the quantity of parts carriers and the types of parts virtually loaded on each of the one or more parts carriers.

21. The method of claim 17, wherein the material handling process is a painting process and the parts carriers are configured to support parts to be painted by the painting process.

* * * * *